US010397051B1

(12) United States Patent
Featonby et al.

(10) Patent No.: US 10,397,051 B1
(45) Date of Patent: Aug. 27, 2019

(54) CONFIGURATION AND TESTING OF NETWORK-BASED SERVICE PLATFORM RESOURCES USING A SERVICE PLATFORM SPECIFIC LANGUAGE

(71) Applicant: Amazon Technologies, Inc., Reno, NV (US)

(72) Inventors: Malcolm Featonby, Cape Town (ZA); Andrew Flower, Cape Town (ZA); Gina Louise Morris, Cape Town (ZA); Francois Norman Daniels, Cape Town (ZA); John Michael Morkel, Cape Town (ZA); Neil Andrew Eriksson, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 573 days.

(21) Appl. No.: 14/311,164

(22) Filed: Jun. 20, 2014

(51) Int. Cl.
*H04L 12/24* (2006.01)

(52) U.S. Cl.
CPC .......... *H04L 41/0813* (2013.01); *H04L 41/08* (2013.01); *H04L 41/0869* (2013.01)

(58) Field of Classification Search
CPC .. G06F 11/3664; H04L 41/08; H04L 41/0813; H04L 41/0869
USPC ................................................ 709/226, 220
See application file for complete search history.

(56) References Cited

U.S. PATENT DOCUMENTS

| 4,591,983 | A | * | 5/1986 | Bennett | G05B 19/41865 235/385 |
|---|---|---|---|---|---|
| 7,392,509 | B2 | | 6/2008 | Sinha et al. | |
| 7,475,235 | B1 | * | 1/2009 | Bernardy | G06F 9/44505 713/1 |
| 8,238,256 | B2 | | 8/2012 | Nugent | |
| 8,595,696 | B2 | | 11/2013 | Maximilien et al. | |
| 2004/0111499 | A1 | * | 6/2004 | Dobrowski | H04L 29/06 709/222 |
| 2006/0253588 | A1 | * | 11/2006 | Gao | G06F 11/3688 709/226 |
| 2007/0260629 | A1 | * | 11/2007 | Tseitlin | G06F 8/20 |
| 2010/0083287 | A1 | | 4/2010 | Maximilien et al. | |
| 2010/0153780 | A1 | * | 6/2010 | Kirtkow | G06F 11/3684 714/37 |
| 2010/0199130 | A1 | * | 8/2010 | Rolia | G06F 11/3688 714/37 |

(Continued)

*Primary Examiner* — Kevin T Bates
*Assistant Examiner* — Chen-Liang Huang
(74) *Attorney, Agent, or Firm* — Robert C. Kowert; Meyertons, Hood, Kivlin, Kowert & Goetzel, P.C.

(57) ABSTRACT

A system or device may implement configuration and testing of network-based service platform resources using a service platform specific language. A configuration file may describe one or more resources of a network-based service platform to be configured, as well as one or more tests to be performed. The configuration file may be described in a service platform specific language for the network-based service platform. When received, the configuration file may be interpreted according to the service platform specific language to identify configuration information for the resources and execution instructions for performing the tests. Requests may be generated and sent to the network-based service platform to configure and provision the resources according to the identified information. Results of the tests may be obtained.

20 Claims, 7 Drawing Sheets

(56) References Cited

U.S. PATENT DOCUMENTS

| | | | |
|---|---|---|---|
| 2012/0185925 A1* | 7/2012 | Barkie | G06F 21/51 726/7 |
| 2012/0198438 A1* | 8/2012 | Auer | G06F 8/61 717/176 |
| 2012/0311157 A1* | 12/2012 | Erickson | G06F 9/541 709/226 |
| 2013/0031529 A1 | 1/2013 | Bernelas et al. | |
| 2013/0080480 A1 | 3/2013 | Mao et al. | |
| 2013/0152047 A1 | 6/2013 | Moorthi et al. | |
| 2013/0159963 A1 | 6/2013 | Dhalait | |
| 2014/0123116 A1 | 5/2014 | Smiljanic et al. | |
| 2014/0331277 A1* | 11/2014 | Frascadore | H04L 63/20 726/1 |

* cited by examiner

CONFIGURATION AND TESTING OF NETWORK-BASED SERVICE PLATFORM RESOURCES USING A SERVICE PLATFORM SPECIFIC LANGUAGE

BACKGROUND

Cloud-based infrastructure offers many advantages for companies, developers, or other entities that may implement new systems and technologies leveraging the accessibility, flexibility, and reliability. Many different types of services, systems, or functions may be implemented using cloud-based resources for client systems or devices. For example, cloud-based resources, such as virtual compute instances, may be used to implement a network-based service for external customers, such as an e-commerce platform. Cloud-based resources may also be used to implement a service or tool for internal customers, such as information technology (IT) service implemented as part of an internal network for a corporation. Cloud-based resources, such as virtual networks, may be used to direct or control network traffic in order to perform the various functions or tasks provided by the services or functions performed utilizing other cloud-based resources, in another example. Instead of investing resources in acquiring various hardware and software components, cloud-based resources may be procured to provide the infrastructure upon which these new systems and technologies may be built.

Cloud-based resources are often provided by a network-based service platform, which may include many different types of network-based services that can be used to implement cloud-based infrastructure resources. Developers can request, provision, and configure various different cloud-based resources from the network-based services offered as part of the development of new systems and products. However, as infrastructure requirements become more complex, the development costs to procure, configure, and test cloud-based resources may increase, as the time and expertise needed to configure and test different respective network-based services in the network-based service platform may increase. Moreover, as the demand to rapidly develop new systems and products in the cloud grows, the speed at which development may occur becomes even more important to compete effectively.

Figure 1:
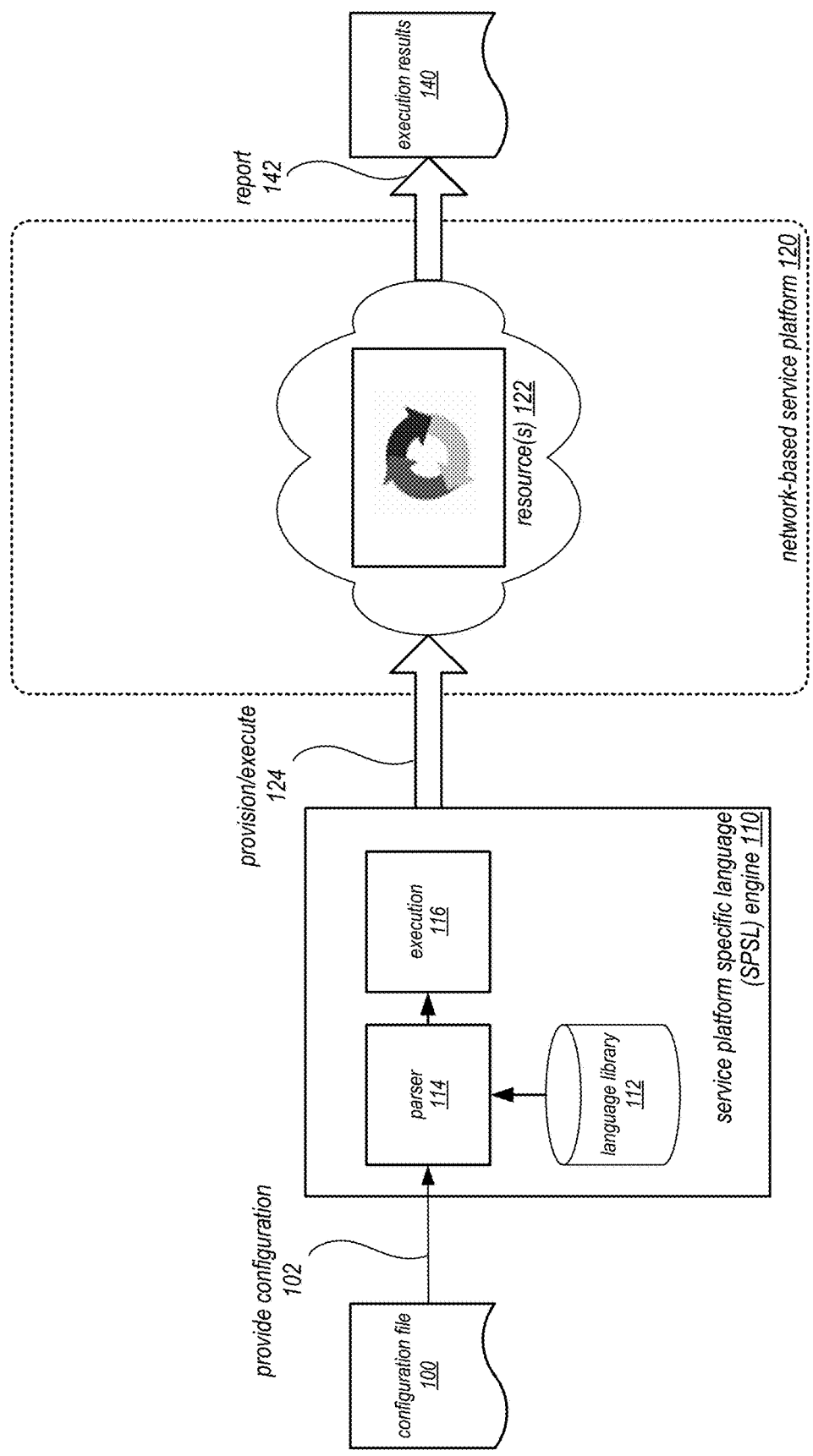
FIG. 1 is a logical data flow diagram illustrating configuration and testing of network-based service platform resources using a service platform specific language, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement configuration and testing of network-based service platform resources using a service platform specific language, according to some embodiments. A network-based service platform may supply clients, operators, or other customers with access to and/or control of resources implemented by different network-based services that are implemented as part of the network-based service platform. These resources may include various types of computing systems or devices configured for communication over a network that provide several different kinds of services, from computing or processing services, storage services, to database services or content delivery services. For example, in some embodiments, a network-based service platform may include a virtual computing service that provides virtual computing resources to clients, users, or other type of customers, in the form of compute instances (e.g., a virtual machine acting as a distinct logical computing system that provides users with the illusion that they are the sole operators and administrators of a given hardware computing resource).

Clients of the network-based service platform may reserve (i.e., purchase or buy) one or more resources (such as compute instances) to perform various functions, services, techniques, and/or applications. Various different configurations of the resources may be determined, arranged, or developed in order to implement these desired functions, services, techniques, and/or applications. For instance, one or more virtual compute instances may be configured using a particular machine image (e.g., a software stack) that has been developed to implement a particular application and placed within a particular virtual network resource configured to include the virtual compute instances. Once these virtual compute instances are configured and launched, it may then be desirable to test the configuration of these instances, including the particular machine images implemented on the virtual compute instances, in order to test whether the particular application is operating as desired or expected. Thus different tests may need to be developed and performed with respect to the various resources configured for the particular application.

As noted above, a network-based service platform may offer many different types of network-based services that may have specific means for interacting with a client. Various different programmatic interfaces (APIs), for instance, may be used to communicate with, setup, and configure resources for each of the network-based services. Thus, complex infrastructures or configurations of resources implemented via the use of multiple network-based services in the platform may require both proficiency and time to configure, provision, and/or launch as desired. Similarly, testing for these configurations may also require further development, as well as understanding of the network-based service platform, in order to properly test a various different functionalities implemented by the resources. Thus, many different steps, scripts, documents, commands, or other actions may need to be taken in order to launch and test a particular configuration of network-based service platform resources. Configuration and testing of network-based service platform resources using a service platform specific language, however, may significantly reduce the work to configure, provision, launch and/or test network-based service platform resources as a single configuration file written in the service platform specific language may be executed, providing faster and less costly development for developers.

FIG. 1 is a logical data flow diagram illustrating configuration and testing of network-based service platform resources using a service platform specific language, according to some embodiments. Network-based service platform 120 may offer many different network-based services for different clients. These network-based services may provide resources (used alone or in various combinations) that may be useful to implement different systems, components, services, or functionalities for different clients of network-based service platform 120. Clients may thus submit a configuration file that includes resource configuration information and execution instructions 100 formatted according to a service platform specific language in order to configure, provision, launch, and test resources of network-based services 120. Service platform specific language (SPSL) engine 110 may be implemented to parse or interpret the information 100 and execute the interpreted configuration file to provision the requested configuration of resources and dynamically perform the execution instructions to complete one or more tests in order to provide execution results 140 to the client.

As shown in FIG. 1, configuration file 100 may be provided 102 to service platform specific language engine 110. In at least some embodiments, configuration file 100 may be a text file or some other configuration data object which may be processable by service platform specific language engine 110. Configuration file 100 may, in various embodiments, be described in a service platform specific language. A service platform specific language may be an imperative language specific to the domain of the network-based services platform, in at least some embodiments. The various instructions, such as statements, commands, components, structure or other information, described as part of the service platform specific language may widely cover the various functionalities, resources, commands or other interactions of the network-based services of the network-based service platform.

Figure 7:
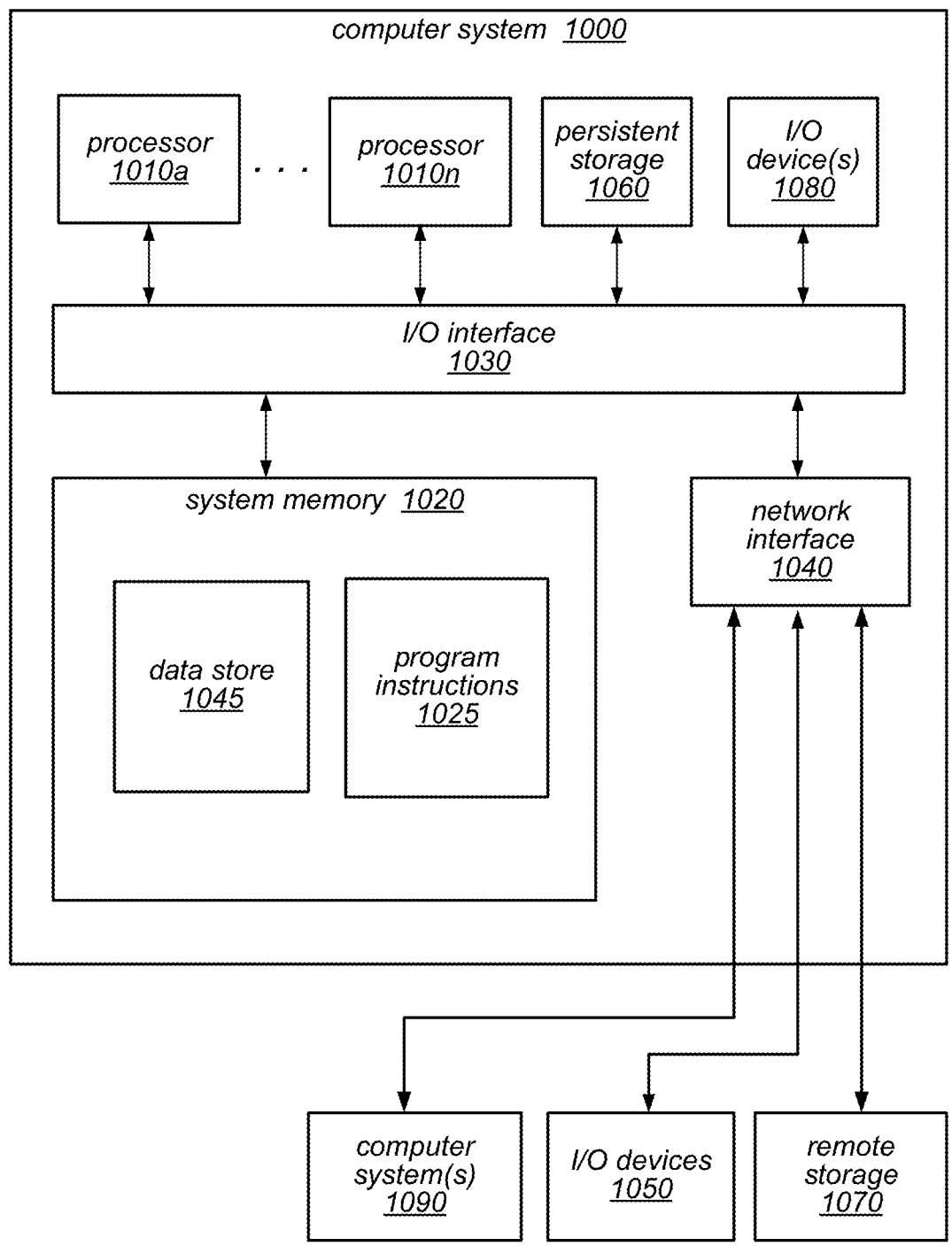
FIG. 7 is a block diagram illustrating an example computing system, according to some embodiments.

Service platform specific language (SPSL) engine 110 may be implemented by various hardware and/or software components on one or more computing devices, such as computing system 1000 described below with regard to FIG. 7. In some embodiments, a client device that communicates or interacts with a network-based service platform, such as network-based service platform 120, may implement SPSL engine 110 (as discussed below with regard to FIG. 2). In some embodiments, SPSL engine 110 (or the components thereof) may be implemented as part of a network-based service platform, such as network-based service platform, in a service or component that performs configuration and testing for clients of the network-based service platform, as discussed below with regard to FIG. 3.

Figure 5:
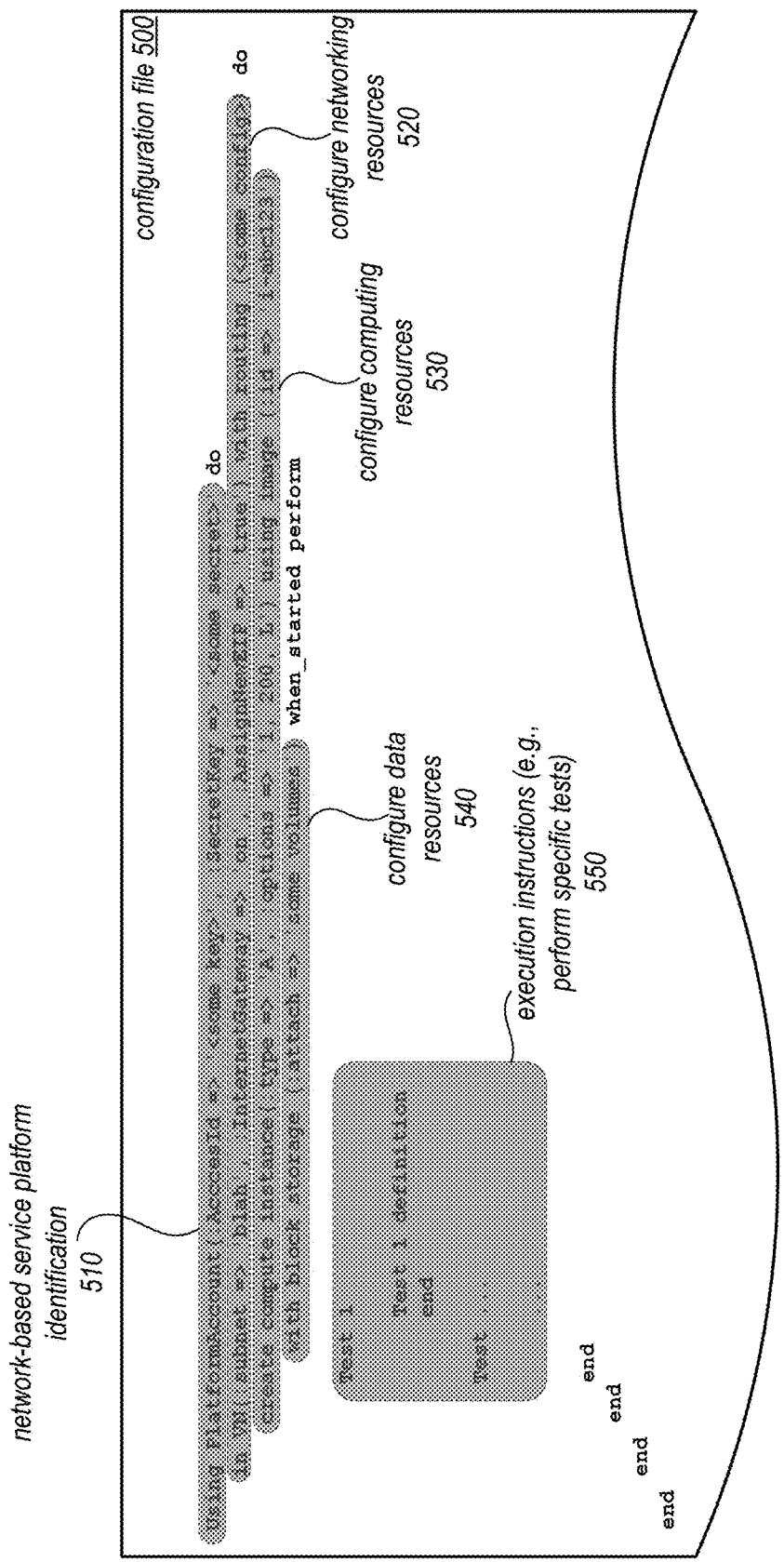
FIG. 5 is an example of a configuration file formatted according to a service platform specific language, according to some embodiments.

As illustrated in FIG. 1, SPSL engine 110 may implement a parser 114. Parser 114 may take the data object or configuration file 100 including resource configuration information and execution instructions and parse or interpret the information described to identify configuration information for one or more resources of network-based service platform and execution instructions to complete one or more tests. For example, parser 114 may access a library 114 for the service platform specific language in order to identify commands, reserved words, operators, or any other component or implementation of the service platform specific language. Various semantic, lexical and/or other techniques may be applied to the information 100. In some embodiments, intermediate code may be generated which may then be optimized before final code generation. For instance, one or more commands may be combined into a single request to be sent to the network-based service platform 120 to perform both commands. FIGS. 5 and 7, discussed below, provide further discussion of various ways that configuration file 100 may be parsed or interpreted according to the service platform specific language.

Once the configuration file 100 is parsed or interpreted to identify for the resources and execution instructions to perform the tests, requests may be generated to configure the resources and the execution instructions programmatically or dynamically performed to complete the tests as described in the identified configuration information and execution instructions, in various embodiments. Various information fields, flags, or other portions of requests, as well as the types of requests to be sent, may be selected, identified and populated by parser 114 based on information maintained in library 112 and the identified configuration information or the identified execution information. These requests may be formatted according to programmatic interfaces for the different network-based services providing the resources to be configured, in some embodiments. For example, if the resources to be configured are provided by a virtual computing service, then the requests may be formatted according to an API for the virtual computing service. Likewise, if another resource identified in the configuration information 100 is implemented by a storage service, then one of the requests may be formatted according to an API for the storage service. An API for the platform-wide actions/requests may also be used to format requests, in some embodiments.

SPSL engine 110 may also implement execution module 116 to handle the timing and sending of requests to network-based service platform 120. For example, in some embodiments, the generated requests may not be sent until an initiate or start indication is received. In some embodiments, the ordering or spacing between requests to network-based service platform 120 may also be enforced by execution module 116. For example, execution module 116 may wait to receive acknowledgements that all of the requested resources are provisioned and configured prior to sending requests to initiate or as part of completing the tests. Moreover, in some embodiments, certain test results may trigger further actions, such as reconfiguring certain resources or running different tests, therefore, in various embodiments, execution module 116 may generally act as an execution platform for dynamically executing configuration file 100.

As illustrated in FIG. 1, the various requests and communications sent from SPSL engine may provision and execute 124 the resources 122 according to the configuration information and execution instructions identified in configuration file 100. As the tests are performed, execution results 140 of the tests may be generated. Execution results 140 may indicate whether tests were passed, failed, or responsive actions taken (e.g., reconfiguring or modifying resources). Execution results may be reported 142 into a storage location of future access or analysis, or to a customer (either as they are generated or collectively), in various embodiments.

Please note that previous descriptions are not intended to be limiting, but are merely provided as a logical example of service platform specific language engines and network-based service platforms. Various other components may interact with or assist in implementing a service platform specific language.

This specification next includes a general description network-based service platform, for which a service platform specific language may be used. Both client devices and an example configuration testing service are provided that interpret and execute a configuration file formatted according to the service platform specific language. Then various examples of a network-based service platform and client are discussed, including different components/modules, or arrangements of components/module that may be employed as part of using a service platform specific language. A number of different methods and techniques to implement configuration and testing of network-based service platform resources using a service platform specific language are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
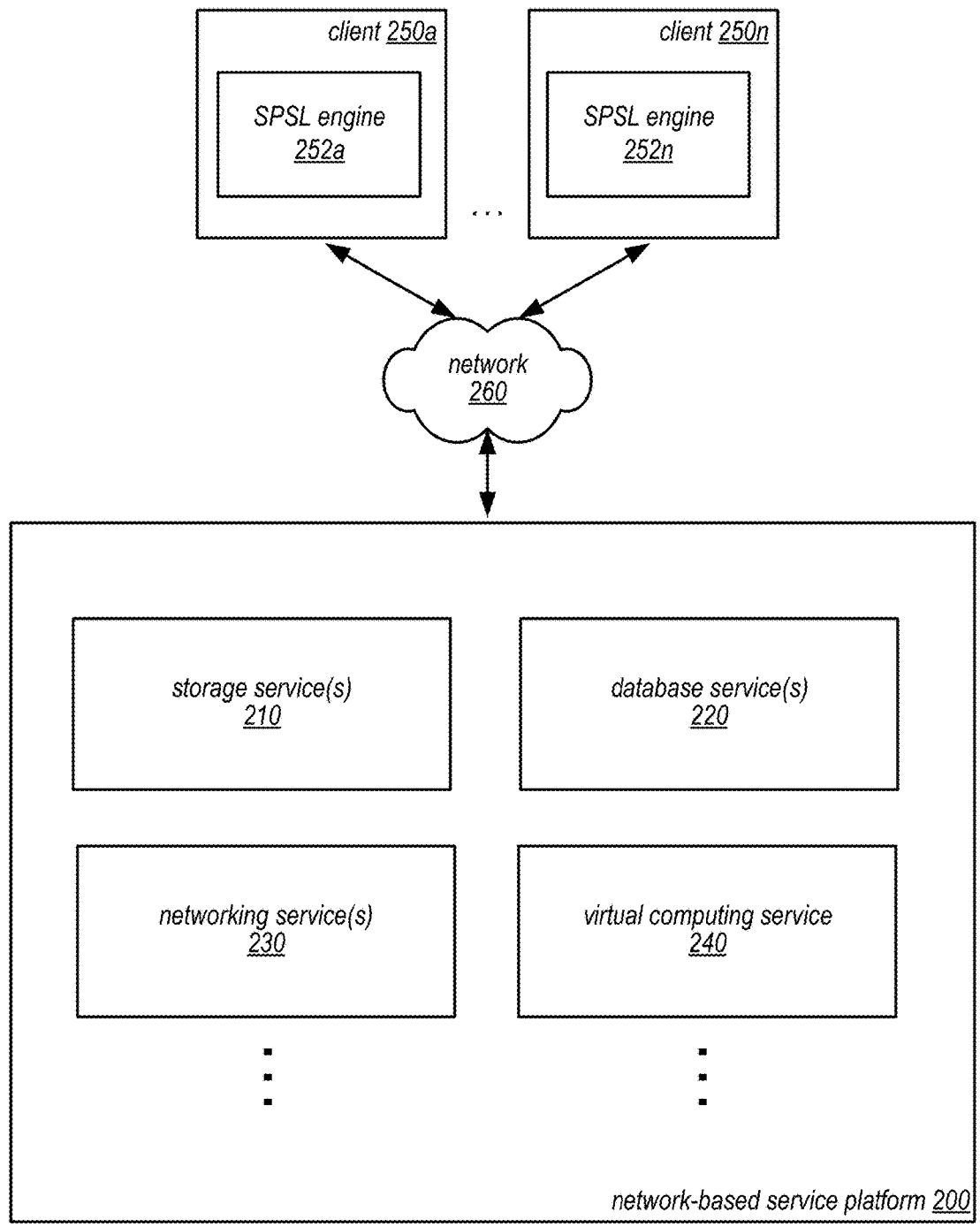
FIG. 2 is block diagram illustrating service platform specific language engines implemented on client devices of a network-based service platform, according to some embodiments.

FIG. 2 is block diagram illustrating service platform specific language engines implemented on client devices of a network-based service platform, according to some embodiments. Network-based service platform 200 may be set up by an entity such as a company or a public sector organization to provide one or more network-based services (such as various types of cloud-based computing or storage) accessible via the Internet and/or other networks to clients 250. Network-based platform 200 may include numerous data centers hosting various resource pools, such as collections of physical and/or virtualized computer servers, storage devices, networking equipment and the like, needed to implement and distribute the infrastructure and services offered by the network-based service platform 200. Clients 250 may be configured to access via network 260 network-based services implemented as part of network-based service platform 200 to perform various tasks, implement various systems, functions, or applications.

Network-based service platform 200 may implement many different kinds of services, and thus the following discussion of various services is not intended to be limiting. In some embodiments, network-based service platform 200 may implement storage service(s) 210. Storage service(s) 210 may be one or more different types of services that provide different types of storage. For example, storage service(s) 210 may be an object or key-value data store that provides highly durable storage for large amounts of data organized as data objects. In some embodiments, storage service(s) 210 may include an archive long-term storage solution that is highly-durable, yet not easily accessible, in order to provide low-cost storage. In some embodiments, storage service(s) 210 may provide virtual block storage for other computing devices, such as compute instances implemented as part of virtual computing service 240. For example, a virtual block-based storage service 210 may provide block level storage for storing one or more data volumes mapped to particular clients, providing virtual block-based storage (e.g., hard disk storage or other persistent storage) as a contiguous set of logical blocks. Storage service(s) 210 may replicate stored data across multiple different locations, fault tolerant or availability zones, or nodes in order to provide redundancy for durability and availability for access.

In some embodiments, network-based service platform 200 may implement database service(s) 220. Database services 220 may include many different types of databases and/or database schemes. Relational and non-relational databases may be implemented to store data, as well as row-oriented or column-oriented databases. For example, a database service that stores data according to a data model in which each table maintained on behalf of a client contains one or more items, and each item includes a collection of attributes, such as a key value data store. In such a database, the attributes of an item may be a collection of name-value pairs, in any order, and each attribute in an item may have a name, a type, and a value. Some attributes may be single valued, such that the attribute name is mapped to a single value, while others may be multi-value, such that the attribute name is mapped to two or more values.

Network-based service platform 200 may implement networking service(s) 230 in some embodiments. Networking service(s) 230 may configure or provide virtual networks, such as virtual private networks (VPNs), among resources implemented in network-based service platform 200 as well as control access with external systems or devices. For example, networking service(s) 230 may be configured to implement security groups for compute instances in a virtual network. Security groups may enforce one or more network traffic policies for network traffic at members of the security group. Membership in a security group may not be related to physical location or implementation of a compute instance. The number of members or associations with a particular security group may vary and may be configured.

Networking service(s) 230 may manage or configure the internal network for network-based service platform 200 (and thus may be configured for implementing various resources for a client 250). For example, an internal network may utilize IP tunneling technology to provide a mapping and encapsulating system for creating an overlay network on network and may provide a separate namespace for the overlay layer and the internal network layer. Thus, in this example, the IP tunneling technology provides a virtual network topology; the interfaces that are presented to clients 250 may be attached to the overlay network so that when a client 250 provides an IP address that they want to send packets to, the IP address is run in virtual space by communicating with a mapping service (or other component or service not illustrated) that knows where the IP overlay addresses are.

In some embodiments, network-based service platform 200 may implement virtual computing service 240, to provide computing resources. These computing resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments clients 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 250 applications, without for example requiring the client 250 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, network-based service platform 200 may implement components to coordinate the metering and accounting of client usage of network-based services, including storage service(s) 210, database service(s) 220, networking service(s) 230, and virtual computing service(s) 240, such as by tracking the identities of requesting clients, the number and/or frequency of client requests, the size of data stored or retrieved on behalf of clients, overall storage bandwidth used by clients, class of storage requested by clients, or any other measurable client usage parameter. Network-based service platform 200 may also implement financial accounting and billing systems, or may maintain a database of usage data that may be queried and processed by external systems for reporting and billing of client usage activity. In certain embodiments, network-based service platform 200 may implement components that may be configured to collect, monitor and/or aggregate a variety of service operational metrics, such as metrics reflecting the rates and types of requests received from clients, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients to enable such clients to monitor their usage of network-based services.

In some embodiments, network-based service platform 200 may implement components to implement user authentication and access control procedures for network-based service platform 200 resources. For example, for a given network-based services request to access a particular compute instance, network-based service platform 200 may implement components configured to ascertain whether the client associated with the access is authorized to configured or perform the requested task. Authorization may be determined such by, for example, evaluating an identity, password or other credential against credentials associated with the resources, or evaluating the requested access to the network-based service platform 200 resource against an access control list for the particular resource. For example, if a client does not have sufficient credentials to access the resource, the request may be rejected, for example by returning a response to the requesting client indicating an error condition.

Network-based services implemented as part of network-based service platform 200 may each implement respective programmatic interfaces, in some embodiments. For example, requests directed to virtual computing service 240 may be formatted according to an API for virtual computing service 240, while requests to storage service(s) 210 may be formatted according to an API for storage service(s) 210. Different portions of the various APIs may be exposed to external clients, in some embodiments, with some other portions remaining available to internal clients, such as other network-based services in network-based service platform 200. A platform-wide API for network-based services platform 200 may also be implemented, in some embodiments.

In various embodiments, network-based storage services may be configured to receive and process requests according to other protocols. For example, virtual compute instances of virtual computing service 240 may be configured to act as web servers, handling Hypertext Transfer Protocol (HTTP) requests. Different database service(s) 220 may be configured to process requests according to various query languages, such as Structured Query Language (SQL), while storage service(s) 210 may be configured to handle transfer protocols, such as File Transfer Protocol (FTP).

Clients 250 may encompass any type of client configurable to submit requests to network-based services platform 200, in various embodiments. For example, a given client 250 may include a suitable version of a web browser, or may include a plug-in module or other type of code module configured to execute as an extension to or within an execution environment provided by a web browser. Additionally, clients 250 may encompass an application, such as a SPSL engine 252. As described above with regard to FIG. 1, SPSL engine 252 may be configured to receive configuration files that describe one or more resources of network-based service platform 200 to be configured according to configuration information and one or more tests to be performed as described in execution information. SPSL engine 252 may parse the configuration file to identify the configuration information and execution instructions, as well as the particular resources, and any other information necessary to configure, provision, launch, initiate and/or terminate the operation of the resources or tests. Requests may be generated and sent according to the configuration file (e.g., in a particular order or as a result of certain conditions or results) and execution instructions programmatically performed to complete the tests. In some embodiments, SPSL engine 252 may be downloaded or obtained from network-based service platform 200 (e.g., as part of registering a customer account or client device with network-based service platform 200).

In some embodiments, SPSL engine 252 may include sufficient support to send the requests according to various programmatic interfaces for the service, as well as other supported protocols at the resources (e.g., Hypertext Transfer Protocol (HTTP)) for generating and processing network-based service requests without necessarily implementing full browser support. In some embodiments, clients 250 may be configured to generate network-based services requests according to a Representational State Transfer (REST)-style network-based services architecture, a document- or message-based network-based services architecture, or another suitable network-based services architecture. In some embodiments, a client 250 (e.g., a computational client) may be configured to provide access to network-based resource in a manner that is transparent to applications implemented on the client 250 utilizing the network-based service platform resource.

Clients 250 may convey network-based services requests to network-based service platform 200 via network 260. In various embodiments, network 260 may encompass any suitable combination of networking hardware and protocols necessary to establish network-based communications between clients 250 and network-based service platform 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 250 and network-based service platform 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based service platform. It is noted that in some embodiments, clients 250 may communicate with network-based service using a private network rather than the public Internet.

Figure 3:
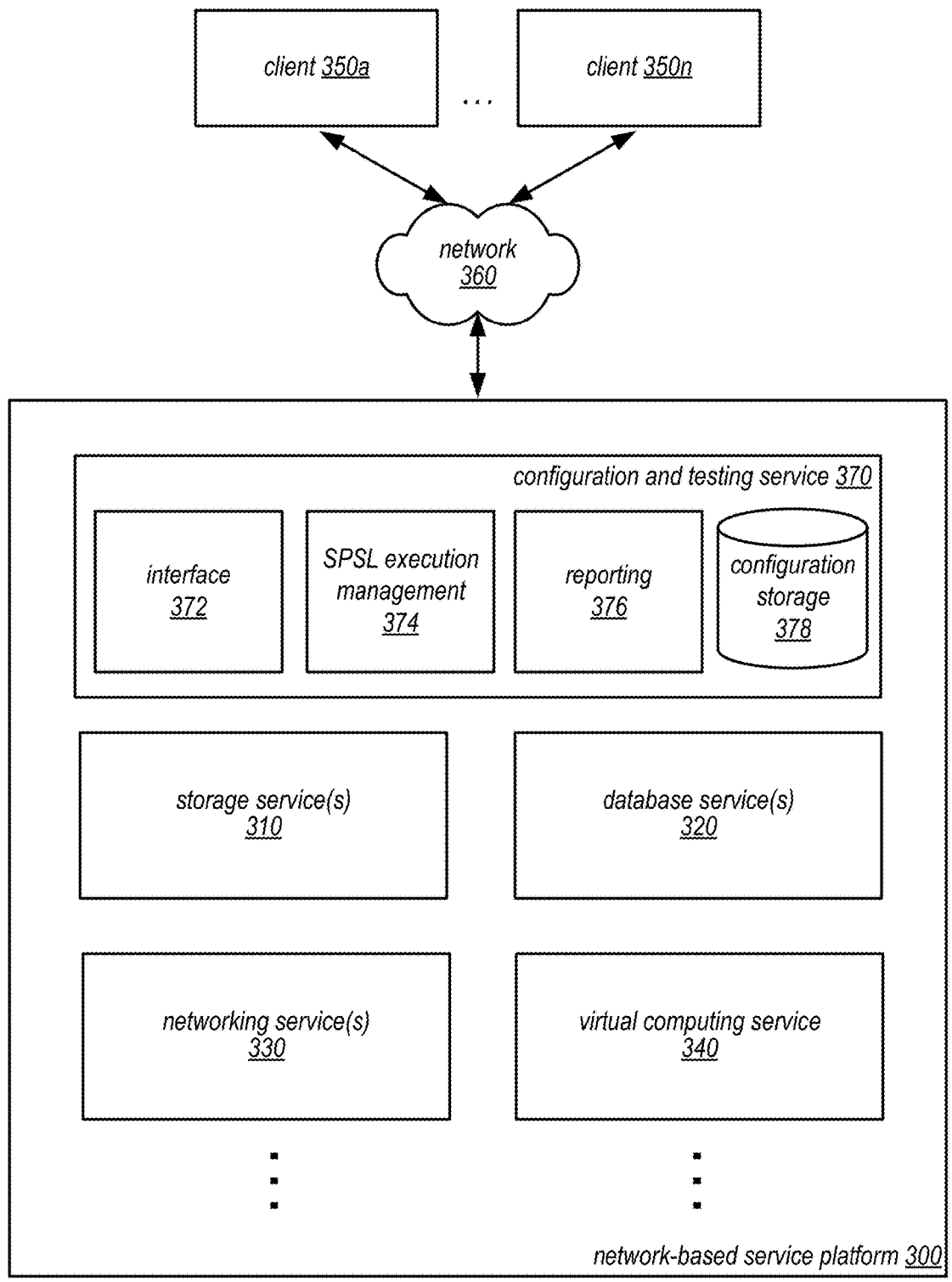
FIG. 3 is a block diagram illustrating a service platform configuration testing service using a service platform specific language, according to some embodiments.

In addition to, or instead of, processing a configuration file formatted according to a service platform specific language for a network-based service platform at a client, a network-based service platform may itself facilitate the processing of configuration files for clients in order to perform configuration testing. FIG. 3 is a block diagram illustrating a service platform configuration testing service using a service platform specific language, according to some embodiments. Network-based service platform 300 may be a network-based platform similar to network-based service platform 200, discussed above with regard to FIG. 2. Many different types of network-based services may be implemented, such as storage service(s) 310, database service(s) 320, networking service(s) 330 and/or virtual computing service(s) 340 (all of which may be similar to those respective services described above with regard to FIG. 2). Clients 350 of network-based service platform 300 may also communicate with network-based service platform 300 via network 360 similar to the discussion above given with regard to FIG. 2.

In various embodiments, network-based service platform 300 may implement configuration testing service 370. Configuration testing service 370 may be implemented across a variety of servers, nodes, or other computing systems or devices (such as computing system 1000 described below with regard to FIG. 7). It is noted that where one or more instances of a given component may exist, reference to that component herein may be made in either the singular or the plural. However, usage of either form is not intended to preclude the other.

Figure 4:
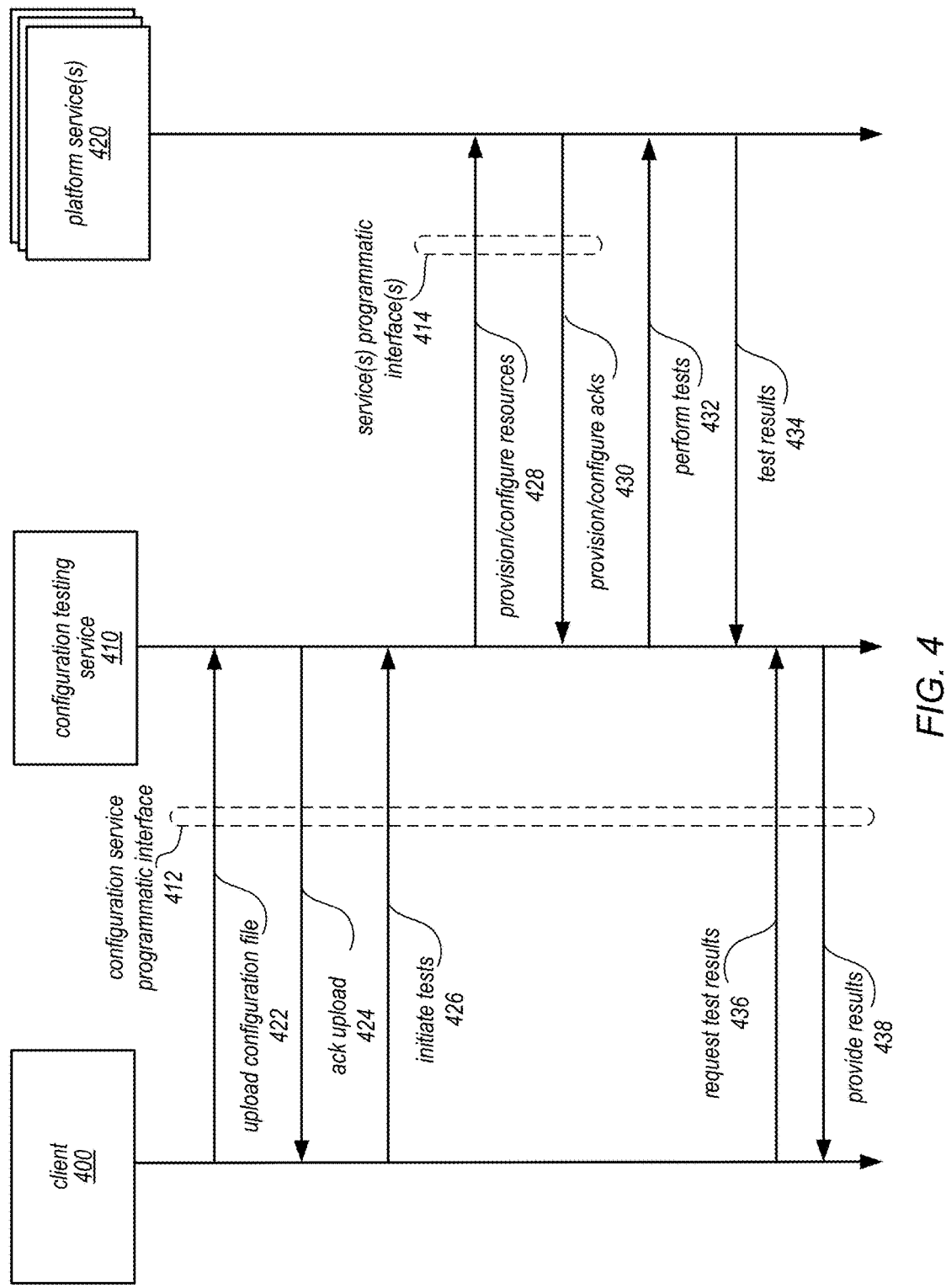
FIG. 4 is a diagram illustrating interactions among a client, configuration testing service using a platform specific language, and network-based services, according to some embodiments.

In at least some embodiments, configuration testing service 370 may implement an interface 372. Interface 372 may include a network-based interface, such as a web site or other graphical user interface via which client requests may be detected and/or received. For example, the network-based interface may provide an upload mechanism for which clients 350 may be configured to indicate selections of particular configuration files to upload or send to configuration testing service 370. In another example, various views of execution results of tests may be displayed via the network-based interface in response to receiving indications of one or more request to display or retrieve execution results. Interface 372 may implement a programmatic interface via which requests may be detected and/or received, as well as responded to. FIG. 4 discusses, in more detail below, some of the various ways in which requests may be processed via a programmatic interface for configuration testing service 370.

Uploaded configuration files may be durably persisted in configuration storage 378. Multiple configuration files may be associated with a particular client and/or customer account. Thus, when an execution or initiation request is received, the particular configuration file indicated in the request may be retrieved from configuration storage 378 for execution. Please note that in some embodiments configuration storage 378 may be implemented as part of another component of network-based service platform 300 (e.g., storage service(s) 310).

In some embodiments, configuration testing service 370 may implement SPSL execution management 374. SPSL execution management 374 may implement many of the various functionalities and techniques described above with regard to SPSL engine 100 FIG. 1 as well as the techniques described below with regard to FIGS. 6 and 7. Generally SPSL execution management 374 may obtain a configuration file formatted according to the service platform specific language for network-based service platform 300. SPSL execution management 374 may parse or interpret the configuration file to identify the configuration information and execution instructions, as well as the particular resources, and any other information necessary to configure, provision, launch, initiate and/or terminate the operation of the resources or tests. Requests may be generated and sent according to the configuration file (e.g., in a particular order or as a result of certain conditions or results) and may be formatted according to various programmatic interfaces for the network-based services. Execution instructions may be dynamically performed to complete the described tests in the configuration file, in various embodiments.

In at least some embodiments, SPSL execution manager 374 may dynamically determine when to load, parse/interpret, provision, launch, and configure resources of network-based service platform 300 as described in a configuration file. For example, a notification or indication of a change to a particular resource configuration (e.g., if the resource is currently operating), then SPSL execution manager 374 may be configured to run the execution instructions for one or more of the tests indicated in the configuration file for or including that resource. Thus, in various embodiments, SPSL execution management 374 may be employed as part of a dynamic configuration testing technique, to perform tests on network-based service platform 300 resources in response to detecting or receiving indications of certain conditions.

In various embodiments, configuration testing service 370 may implement reporting module 376. Reporting module 376 may be configured to obtain execution result information generated as the various tests are completed. In some embodiments, reporting module 370 may be configured to send the execution results to a data store, such as a specific storage location in data storage service 310 storing results information for a particular client/customer account. In some embodiments, reporting module 376 may also be configured to send the execution results to clients 350, either for individual tests or in aggregate for multiple tests. Reporting module 376 may also be configured to generate particular views of the execution results (e.g., particular tables, graphs, charts, or other visual arrangements of test results) as well as manipulate the execution results data according to various common analysis techniques (e.g., percentage tests passed, percentage failed).

FIG. 4 is a diagram illustrating interactions among a client, configuration testing service using a platform specific language, and network-based services, according to some embodiments. Client 400 may be configured to upload a configuration file 422 via configuration service programmatic interface 412 to configuration testing service 410. The configuration file may be uploaded in one or more parts to configuration testing service 410 which may associate and store the configuration file with client 412. In some embodiments, an acknowledgement 424 may be provided that the configuration file 424 was successfully uploaded.

A request to initiate tests 426 may be received via configuration service 412 at configuration testing service 410. Configuration testing service may then parse/interpret the configuration file (or may have already pre-parsed or interpreted the configuration file). The resources identified in the configuration file may then be provisioned/configured 428 by sending requests via service(s) programmatic interface(s) 414 to one or more platform services. For example, the configuration file may configure multiple virtual compute instances in a virtual network and be connected to data volumes of virtual block storage. Thus, requests may be sent 428 to a virtual computing service, networking service, and storage service according to respective APIs for these services. In some embodiments, various acknowledgments 430 of the provision/configure requests.

Requests (or other actions) may be dynamically performed in order to perform tests and may be sent/performed 432 with respect to platform services 420. For example, a test may be a validation of a particular assertion about the content supplied by one of the configured resources (e.g., web page presented by a resource should be a home page). For instance, the execution instructions may instruct generation and sending of fake user requests to be processed at the resource in order to see how the request is treated (if the particular assertion succeeds or fails about the action of the resource), or the request may ask the resource to perform a test, such as a self-check (or ask another resource to perform the test), in some embodiments. Test results 434 may, in some embodiments, be sent back to configuration testing service 410. Requests for the execution results 436 may be sent to configuration testing platform 410 via configuration service programmatic interface 412. In response, results may be provided 438 via configuration testing service programmatic interface 412 to client 400.

As noted above, the service platform specific language may be directed toward a network-based service platform, a particular domain. This domain-specific language for the network-based service platform may be used to imperatively configure and/or test resources implemented by services. As there are many types of resources, components, services, actions, and other aspects of a network-based service platform that may be described by the service platform specific language, the following example and discussion is not intended to be limiting. FIG. 5 is an example of a configuration file formatted according to a service platform specific language, according to some embodiments.

Configuration file 500 may be a file or data object containing the symbols of the service platform specific language. Various different types of configuration and execution instructions may be described. In this example, the configuration file includes identification information for the network-based service platform 510. "AccessID" may be some form of identifier or username to indicate a particular account for the network-based service platform. Likewise, "SecretKey" may be some form of password, credential, or other information that authenticates or validates the identity of the account responsible for executing the configuration file 500. Various other identification/authorization measures may be implemented which may be implemented via the service platform specific language (e.g., sending and receiving information from and to a third-party authentication service).

In some embodiments, networking resources 520 may also be configured, as illustrated in configuration file 500. For example, a virtual network may be created (e.g., "VN" with a particular subnet "blah" and particular configuration flags "InternetGateway=>'on', :AssignNewEIP=>'true') with routing (<some config>)"). More generally, various different networking resources may be configured, such as creating gateways, setting DHCP options, configuring IP addresses, configuring network interfaces, network ACLs, routing tables, security groups, subnets, modifying virtual networks, connections, peering, private gateways, or load balancing.

In some embodiments, computing resources 530 may be configured/created. For example, a compute instance of particular type "A" with various other options set and using a particular machine image "id=>'i-abc123'" may be configured, provisioned, and launched, and stopped. More generally, various different computing resources may be configured, such as machine images, actions taken with respect to compute instances (describe, monitor, modify, reboot, report, run, start, stop, or terminate), grouping or placing multiple instances, or determining particular types or billing schemes for compute instances. The various different examples of compute instances and other compute resources discussed above with regard to FIGS. 2 and 3 may also be described and actions taken against as may be described using the service platform specific language.

In some embodiments, data resources may be configured, as indicated at 540, in configuration file 500. For example, "some volumes" of block storage may be attached to a compute instance. More generally data resources may be configured, such as: attaching, creating, describing, modifying, or deleting particular data volumes or snapshots of virtual block storage; storing, accessing, or deleting objects in object-based data stores or databases; configuring database tables or performance and/or consistency mechanisms; or any other type of storage offered by storage services in a network-based service platform.

In various embodiments, execution instructions may also be provided to execute one or more tests, or reconfigure or change resources (e.g., networking resources 520, computing resources 530 or data resources 540) as illustrated at 550 in configuration file 500. For example, "Test 1" may include a particular set of instructions to perform a particular test, which may include one or more actions to be taken in order to complete a test. For example, an assertion about a particular action that a resource should take or data that it should maintain may be stated. Then, a test action may be described that is to be performed in order to validate the assertion. For example, the execution information may direct a visit to a particular web page hosted by a configured resource in the network-based service platform. The assertion may describe particular content that the web page should have (e.g., particular text, items, pictures or other content displayed). The contents of the web page may be returned and validated against the assertion. More generally, execution instructions may describe an expected behavior or state of network-based service platform resources and how to test that expected behavior or state. Execution instructions may dynamically or programmatically respond to the various inputs/outputs received as a result of performing other execution instructions and provide further actions (or non-actions) to be taken in response. In some embodiments, execution instructions may validate the state/configuration of other network-based service platform resources that may have not been configured, provisioned, or launched by the configuration file (e.g., preexisting resources).

As noted earlier, the service platform specific language may be imperative and thus may actively change the state of resources, in some embodiments. Thus, execution instructions may also include logic for handling the results of a particular test (in addition to reporting the results). For example, if a particular test is failed (or passed), one or more actions may be taken with respect to network-based service platform resources (whether those described in the configuration file or other resources). Consider the scenario, where a test validates the configuration of various back-end processing instances for particular distributed system. The configuration file may describe one or more instances implementing front-end components which are being tested for interoperability with the back-end. If an expected configuration of the back-end processing instances is not validated, then a one or more configuration changes may be made to the front-end instances (e.g., ending and re-launching the front-end instances with a different machine image or software stack).

Figure 6:
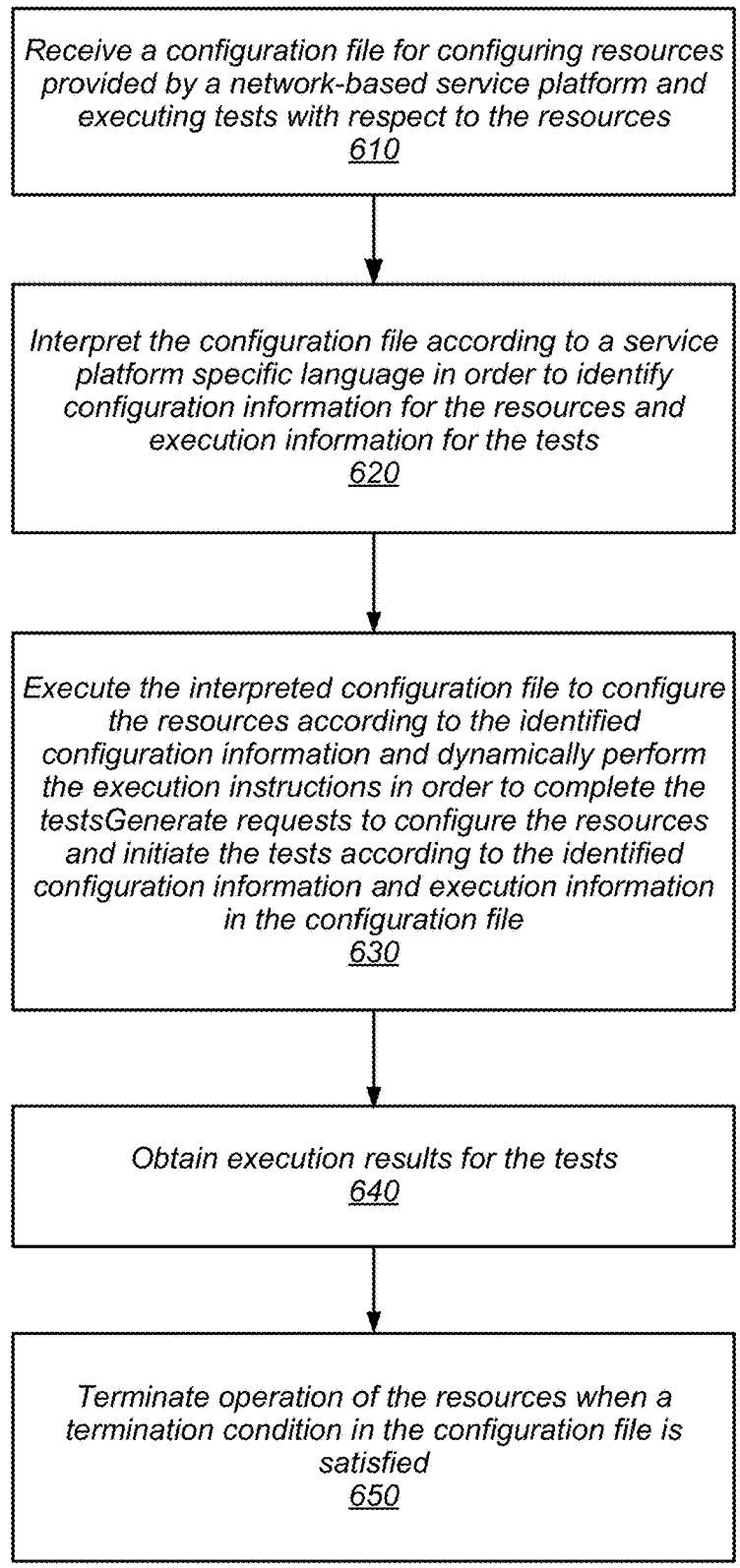
FIG. 6 is high-level flowchart illustrating various methods and techniques for implementing configuration and testing of network-based service platform resources using a service platform specific language, according to some embodiments.

The clients, network-based service platforms, configuration testing services, and other components that implement configuration and testing of network-based service resources using a service platform specific language discussed above with regard to FIGS. 1-5 have been given as examples. Various other types or configurations of clients, network-based service platforms, configuration testing services, and other components may implement these techniques. Thus, FIG. 6 is high-level flowchart illustrating various methods and techniques for implementing configuration and testing of network-based service platform resources using a service platform specific language, according to some embodiments.

As indicated at 610, a configuration file may be received for configuration resources provided by a network-based service platform and executing tests with respect to the resources, in various embodiments. The configuration file may be formatted according to a service platform specific language for the network-based service platform. In various embodiments, the configuration file may be received or uploaded to a service, such as configuration testing service 370 described above in FIG. 3, or at a client device, such as client device 250 described above in FIG. 2.

As indicated at 620, the configuration file may be interpreted according to the service platform specific language in order to identify configuration information for the resources and execution instructions to complete the tests. In various embodiments, one or more semantic, syntactical and/or lexical analyses may be performed to parse or identify the various symbols, keywords, or other content invoked by the language in the configuration file such that implementation information (e.g., as may be obtained by accessing a language library for the service platform specific language) may be appropriately applied, and the configuration information and the execution information in the configuration file correctly interpreted. FIG. 5, discussed above, provides many different examples of configurations or other actions that may be taken with regard to network-based service platform resources, as well as the various ways in which tests may be described.

As indicated at 630, the interpreted execution file may be executed, in various embodiments. Requests to configure the resources may be generated and sent to the network-based service platform according to the identified configuration information in the configuration file. In at least some embodiments, the requests to configure the resources may be formatted according to programmatic interfaces for the respective network-based service providing or implementing the resource. Execution instructions for the initiation and/or performance of the tests may be dynamically performed in order to carry out the tests, whether to trigger certain actions or behaviors at a resource (e.g., by mimic a client request for an implemented application), validate or determine the state or configuration of a resource, or perform any other kind of action, such as a particular order, timing or as the result of particular conditions, as described in the configuration file. The library for the service platform specification language may provide the format or information necessary to generate executable versions of the execution instructions, in some embodiments.

Execution results for the tests may be obtained, in various embodiments, as indicated at 640. Execution results may be stored in a single location as they are determined, in some embodiments, and later reported in aggregate or in groups to particular clients or other systems for analysis. While, in some embodiments, execution results may be reported as they are received. For example, a notification, display, message, communication or other indication of results may be sent to a client or provided at a client device that submitted the configuration file.

As indicated at 650, the operation of the resources may be terminated when a termination condition in the configuration file is satisfied. In some embodiments, the termination condition may be satisfied by default without being explicitly described in the configuration file. For example, the termination condition may be satisfied when all of the described tests are completed. In some embodiments, an explicitly described determination condition may be included in the configuration file. For instance, a certain key-word, conditional statement, or other symbol may indicate that the resources are to continue operating until a request to terminate is received or a certain amount of time has passed. In this way, some tests, for example could be performed in a loop for a period of time rather than for a discrete number of repetitions. Once the condition is satisfied, then various requests to terminate, halt, decommission, or stop the resources may be sent to various network-based service implementing the resources according to their respective programmatic interfaces, in some embodiments.

A configuration file is not limited to launching one set of resources and performing one set of tests, in various embodiments. As noted above, the service platform specific language may imperatively describe many different actions based on the result of tests or other logical decisions. In at least some embodiments, a configuration file may include multiple resources that are launched during or after the launching of other resources, tests that are performed during or after the performance of other tests. For example, in some embodiments, upon completion of the tests for resources and termination of the resources, the configuration file may describe other resources to launch and other tests to perform according to the techniques described above in FIG. 6. Thus, the ordering and or performance of configuring, provisioning, and/or launching resources and executing tests is not to be construed as limited to a single set of resources or tests.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers and other components that implement the client and/or network-based service platform described herein). The various methods as illustrated in the figures and described herein represent example embodiments of methods. The order of any method may be changed, and various elements may be added, reordered, combined, omitted, modified, etc.

Embodiments of configuration and testing of network-based service platform resources using a service platform specific language as described herein may be executed on one or more computer systems, which may interact with various other devices. FIG. 7 is a block diagram illustrating an example computer system, according to various embodiments. For example, computer system 1000 may be configured to implement nodes of a network-based service, a data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a service platform specific language engine, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 7 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more processors;
a memory, comprising program instructions configured to cause the one or more processors to implement a service platform specific language engine;
the service platform specific language engine, configured to:
receive a configuration file including:
configuration information for configuring one or more resources implemented as part of a network-based service platform, and
a plurality of execution instructions for executing one or more tests of the one or more resources after the one or more resources have been configured, and
wherein the configuration file is formatted according to a service platform specific language for the network-based service platform;
parse the configuration file according to the service platform specific language in order to identify a configuration for the one or more resources and the plurality of execution instructions to execute the one or more tests on the one or more resources after the one or more resources have been configured;
execute the configuration file, wherein as part of executing the configuration file the service platform specific language engine is configured to:
send one or more requests to provision the one or more resources according to the identified configuration, wherein those requests of the one or more requests that provision the one or more resources are formatted according to a respective one or more programmatic interfaces for one or more respective network-based services providing the one or more resources to be configured; and
programmatically perform the identified plurality of execution instructions to execute the one or more tests, wherein to programmatically perform the identified execution instructions comprises sending one or more test requests to the one or more resources after the one or more resources have been configured; and
receive execution results for the one or more tests, wherein the execution results include responses to the one or more test requests.

2. The system of claim 1,
wherein the system implements a client device of the network-based service platform;
wherein the system further comprises at least one persistent storage device maintaining a library describing the service platform specific language; and
wherein the parse of the configuration file is performed based, at least in part, on accessing the library describing the service platform specific language.

3. The system of claim 1,
wherein the service platform specific language engine is implemented as part of a configuration testing service for the network-based service platform;
wherein the system further comprises one or more compute nodes that together implement a network-based interface for the configuration testing service, wherein the configuration file is received via the network-based interface for the configuration testing service from a client associated with a particular customer account of the network-based service platform; and
wherein the service platform specific language engine is further configured to provide the execution results for the one or more tests via the network-based interface to the client.

4. The system of claim 1, wherein the service platform specific language is an imperative language.

5. A method, comprising:
performing, by one or more computing devices:
receiving a configuration file for:
configuring one or more resources implemented as part of a network-based service platform, and
executing one or more tests of the one or more resources after the one or more resources have been configured, wherein the configuration file includes corresponding execution instructions to execute different ones of the one or more tests,
wherein the configuration file is formatted according to a service platform specific language for the network-based service platform;
interpreting the configuration file according to the service platform specific language in order to identify a configuration for the one or more resources and the execution instructions to execute the one or more tests on the one or more resources after the one or more resources have been configured; and
executing the interpreted configuration file, comprising:
sending one or more requests to the network-based service platform to provision the one or more resources according to the identified configuration, wherein the one or more requests that provision the one or more resources are formatted according to a respective one or more programmatic interfaces for one or more respective network-based services providing the one or more resources to be provisioned according to the identified configuration; and
dynamically performing the identified plurality of execution instructions to execute the one or more tests, wherein dynamically performing the execution instructions comprises sending one or more test requests to the one or more resources after the one or more resources have been provisioned according to the identified configuration; and
obtaining execution results for the one or more tests, wherein the execution results include responses to the one or more test requests.

6. The method of claim 5, wherein the one or more computing devices implement a client associated with a particular customer account of the network-based service platform, and wherein said interpreting the configuration is based, at least in part, on accessing a library at the client describing the service platform specific language.

7. The method of claim 6, wherein the one or more requests sent to the network-based service platform include an access credential indicating authorization to provision the one or more resources for the particular customer account.

8. The method of claim 5, wherein the one or more resources comprise at least one of:
a networking resource;
a computing resource; or
a data resource.

9. The method of claim 5, further comprising:
upon completion of the one or more tests, terminating operation of the one or more resources.

10. The method of claim 9, wherein the configuration file further specifies a configuration for another one or more resources of the network-based service platform and another plurality of execution instructions for one or more tests with respect to the other one or more resources, and wherein said interpreting, said executing, and said obtaining are performed with respect to the other one or more resources and the other one or more tests.

11. The method of claim 5, wherein one of the one or more tests validates the configuration of a different one or more resources of the network-based service platform.

12. The method of claim 5, wherein the one or more computing devices together implement a configuration testing service, wherein the configuration testing service is implemented as part of the network-based service platform, wherein the configuration file is received via a programmatic interface for the configuration testing service.

13. The method of claim 12, further comprising:
in response to detecting a change to the one or more resources, dynamically performing the plurality of execution instructions to complete the one or more tests again with respect to the changed one or more resources.

14. A non-transitory, computer-readable storage medium, storing program instructions that when executed by a plurality of computing devices cause the one or more computing devices to implement:
receiving a configuration file for:
configuring one or more resources implemented as part of a network-based service platform,
executing one or more tests of the one or more resources after the one or more resources have been configured, wherein the configuration file includes corresponding execution instructions to execute different ones of the tests, and
wherein the configuration file is formatted according to a service platform specific language for the network-based service platform;
interpreting the configuration file according to the service platform specific language in order to identify a configuration for the one or more resources and the execution instructions to execute the one or more tests on the one or more resources after the one or more resources have been configured;
executing the interpreted configuration file, comprising:
sending one or more requests to provision the one or more resources according to the identified configuration, wherein the one or more requests that provision the one or more resources are formatted according to a respective one or more programmatic interfaces for one or more respective network-based services providing the one or more resources to be provisioned according to the identified configuration; and
programmatically performing the identified plurality of execution instructions to execute the one or more tests, wherein programmatically performing the execution instructions comprises sending one or more test requests to the one or more resources after the one or more resources have been provisioned according to the identified configuration; and
receiving execution results for the one or more tests, wherein the execution results include responses to the one or more test requests.

15. The non-transitory, computer-readable storage medium of claim 14, wherein the one or more computing devices implement a client associated with a particular customer account of the network-based service platform, and wherein said interpreting the configuration file is based, at least in part, on accessing a library at the client describing the service platform specific language.

16. The non-transitory, computer-readable storage medium of claim 14, wherein the identified plurality of execution instructions to execute one of the one or more tests instruct one or more configuration changes to be performed with respect to at least one of the one or more resources in response to a particular result of the one test, and wherein the program instructions further cause the one or more computing devices to implement:
in response to detecting the particular result of the one test, sending one or more requests to perform the one or more configuration changes with respect to the at least one resource as instructed in the plurality of execution instructions.

17. The non-transitory, computer-readable storage medium of claim 14, wherein the one or more resources are implemented as part of at least one of:
a virtual computing service of the network-based service platform;
a storage service of the network-based service platform; or
a database service of the network-based service platform.

18. The non-transitory, computer-readable storage medium of claim 14, wherein the program instructions cause the one or more computing devices to implement:
upon completion of the one or more tests, terminating operation of the one or more resources.

19. The non-transitory, computer-readable storage medium of claim 14, wherein the one or more computing devices together implement a configuration testing service, wherein the configuration testing service is implemented as part of the network-based service platform, wherein the configuration file is received via a programmatic interface for the configuration testing service from a client of the network-based services.

20. The non-transitory, computer-readable storage medium of claim 19,
wherein the execution of the interpreted configuration file is performed in response to receiving a request to initiate the one or more tests via the programmatic interface from the client; and
wherein the program instructions cause the one or more computing devices to further implement providing the execution results to the client in response to receiving a request for the execution results from the client via the programmatic interface.

* * * * *